July 25, 1939.　　　　　G. GUÉRARD　　　　　2,167,403
SPRING SUSPENSION FOR MOTOR VEHICLES AND THE LIKE
Filed Oct. 12, 1937　　　4 Sheets-Sheet 1

G. Guérard
Inventor

By Glascock Downing Seebold
Attys.

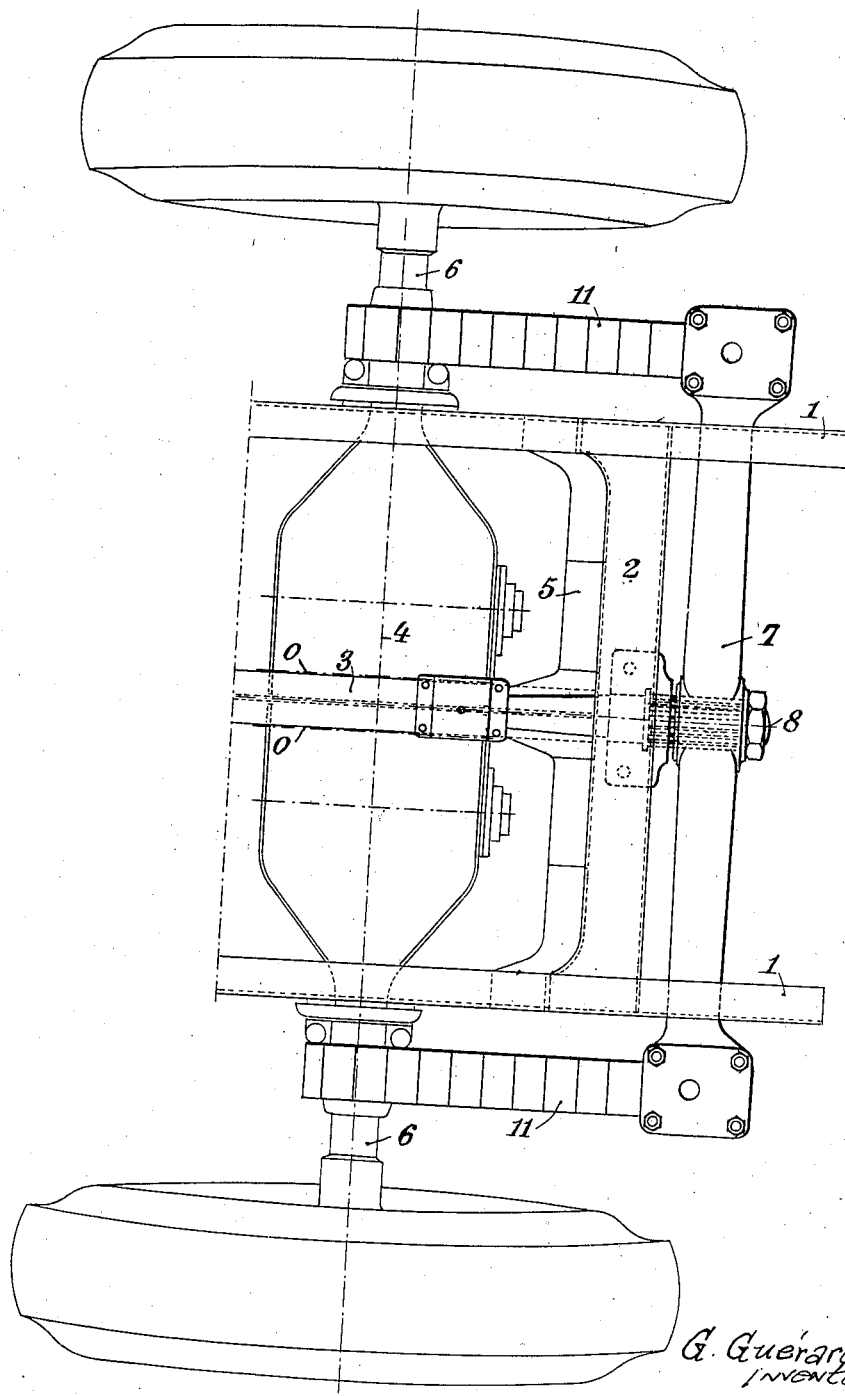

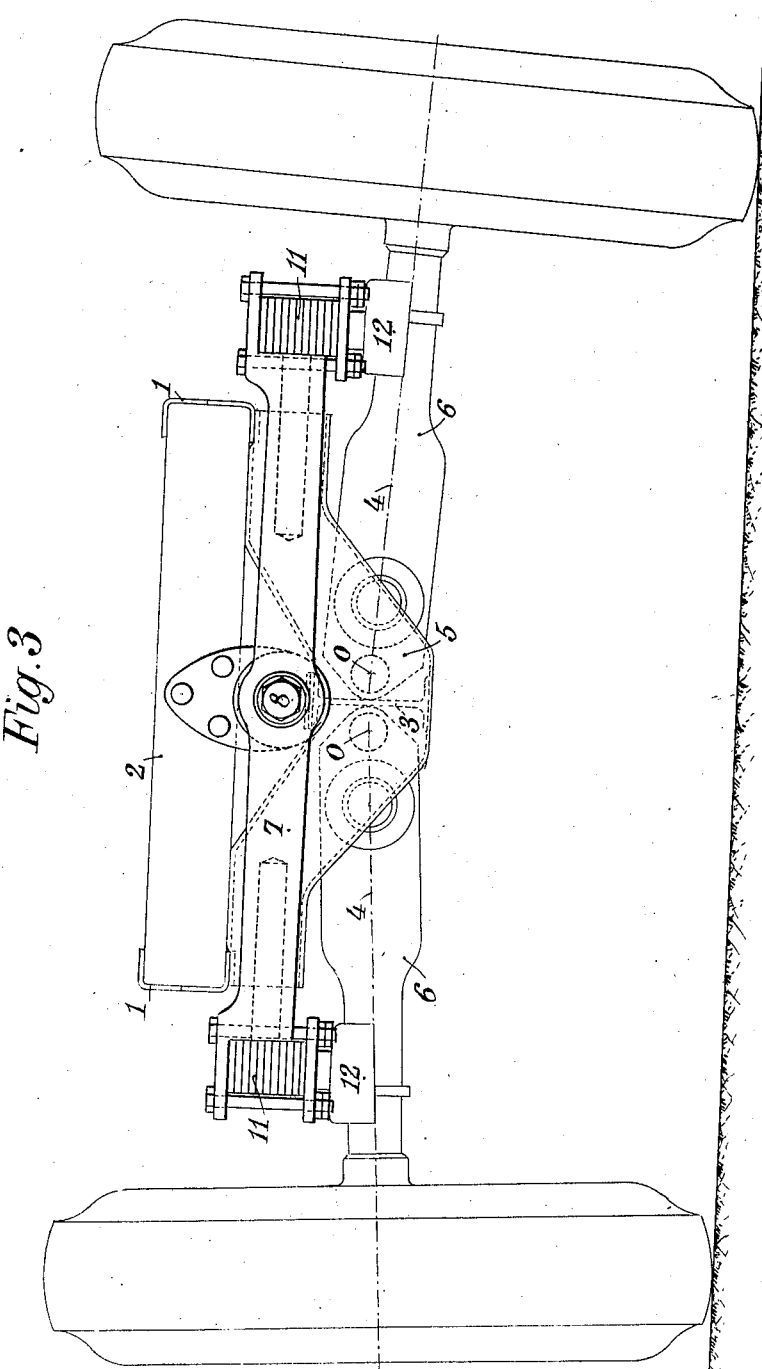

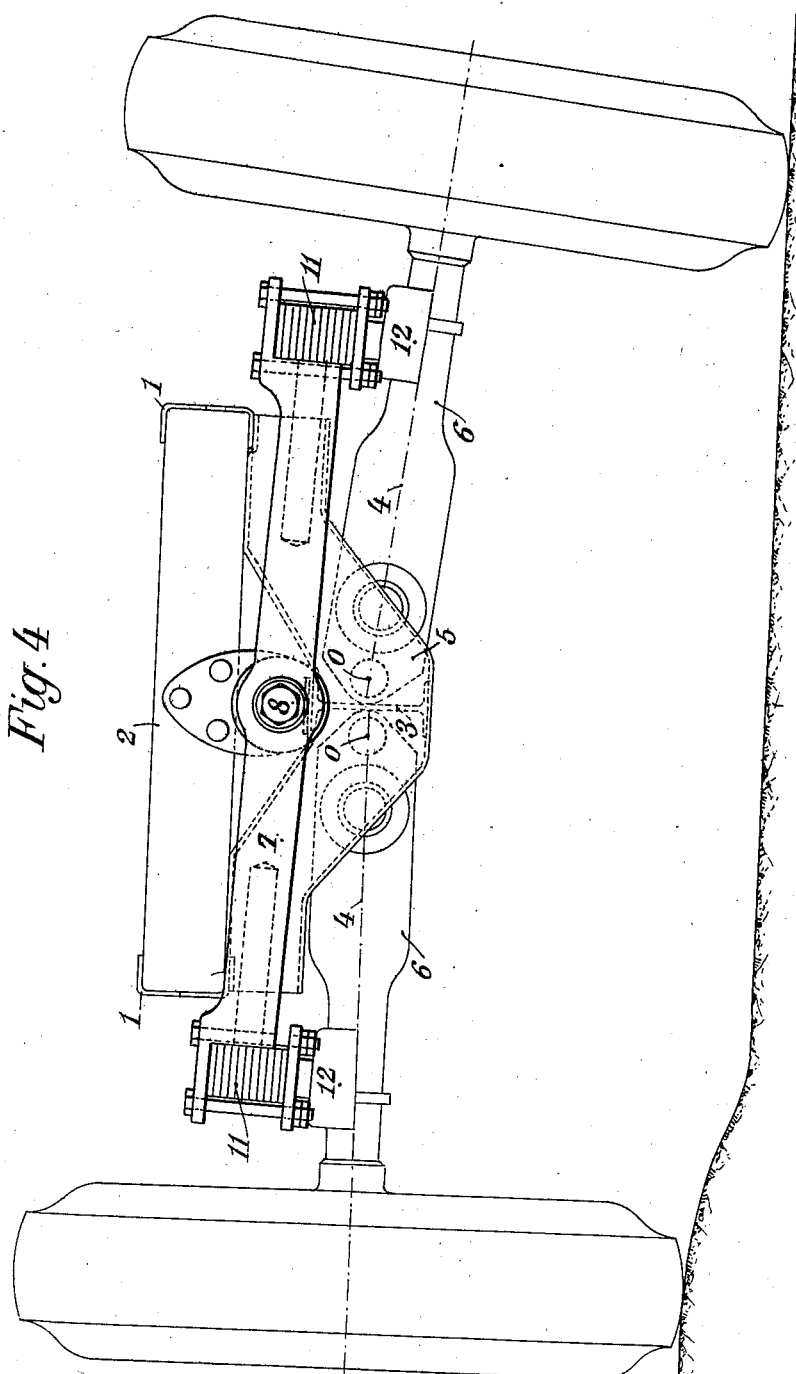

Patented July 25, 1939

2,167,403

UNITED STATES PATENT OFFICE 2,167,403

SPRING SUSPENSION FOR MOTOR VEHICLES AND THE LIKE

Georges Guérard, Asnieres, France, assignor to Societe Anonyme dite Etablissements Laffly, Asnieres, France Application October 12, 1937, Serial No. 168,653
In France October 17, 1936

2 Claims. (Cl. 267—19)

The object of this invention is a spring or resilient suspension, to be adapted more particularly to the rear driving wheels of a vehicle frame equipped with so-called independent wheels.

Suspensions comprising coil springs combined with articulated parallelograms, are known in which these combined devices are each adapted at one end of a transverse beam or flier capable of swinging around a horizontal axis situated in the vertical middle plane of the vehicle frame; there are also known devices of the same kind in which the transverse beam itself is constituted by a cross spring the ends of which are directly articulated on the stubshafts of the wheels and which must also be combined with links or connecting rods so as to form for each wheel a parallelogram capable of being distorted in a resilient manner.

The said systems are intricate, cumbersome and composed of a large number of parts.

The purpose of this invention is to provide a suspension of this kind which is simplified and in which longitudinal half-springs are used. These are provided with leaves or are laminated, combined with a transverse beam or flier, this system being particularly suitable when used for the suspension of the rear driving wheels, in which case the said half-springs may be disposed so as to be used as elements of traction and not as elements of pushing.

The combination of two longitudinal half-springs with a transverse beam or flier results in a suspension with transverse beam or flier which is simple, not cumbersome and composed of very few parts.

The small oscillations of the suspension, caused by the small unevenness of the road, are for the most part deadened or absorbed by the springs and determine but very small movements of the transverse beam or flier which practically are not even transmitted to the vehicle frame. When one of the wheels overleaps a big obstacle, the corresponding end of the transverse beam or flier is lifted and the whole of the suspension substantially oscillates around a fulcrum on the ground where the opposite wheel is, so that the vehicle frame is itself raised by the pivot bolt or axis of the beam by an amount which is about equal to one half of the displacement of the wheel which has been raised, this raising of the wheel being moreover reduced by virtue of the flexure of the springs; but, due to the articulated fastening or adaptation of the transverse beam to the middle of the rear part of the vehicle frame, the latter is not subject to any twisting stress, even when the wheel on one side passes over an obstacle of a relatively great height.

Moreover, in case one of the wheels is accidentally overloaded, in a curve for instance, or when the said wheel is raised by an obstacle or sinks into a hole or into soft ground, the transverse beam transmits part of the said overload to the other wheel, which results in a better distribution of the loads and consequently gives the vehicle better steadiness.

An embodiment of the suspension according to the invention has been represented by way of example in the accompanying drawings.

Fig. 2 is a plan of same.

Fig. 3 is a view from the rear, the two wheels resting on a flat ground.

Fig. 4 is a similar view, one of the wheels passing over an obstacle.

Figure 1:
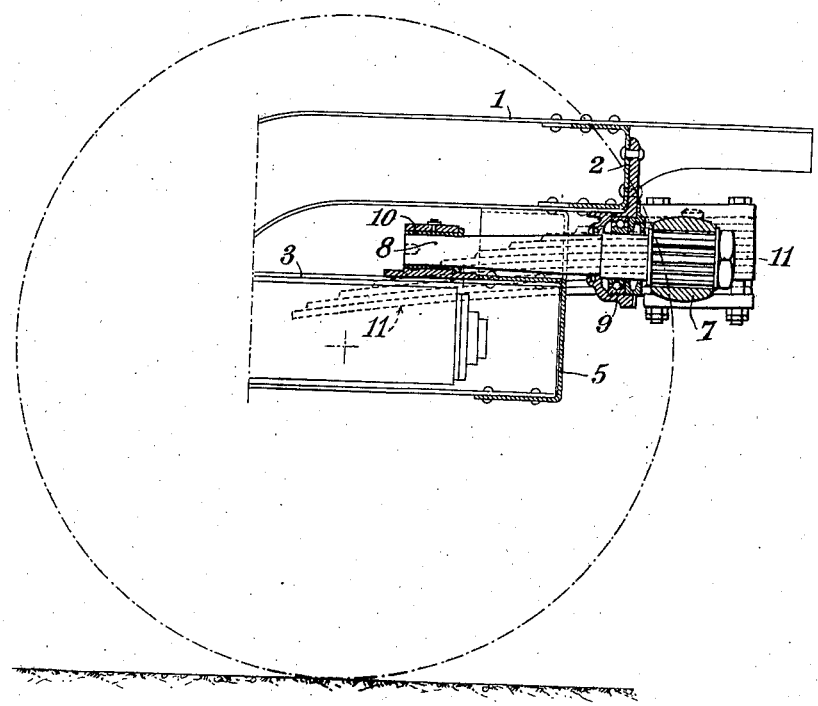
Fig. 1 is a longitudinal section.
Figure 5:
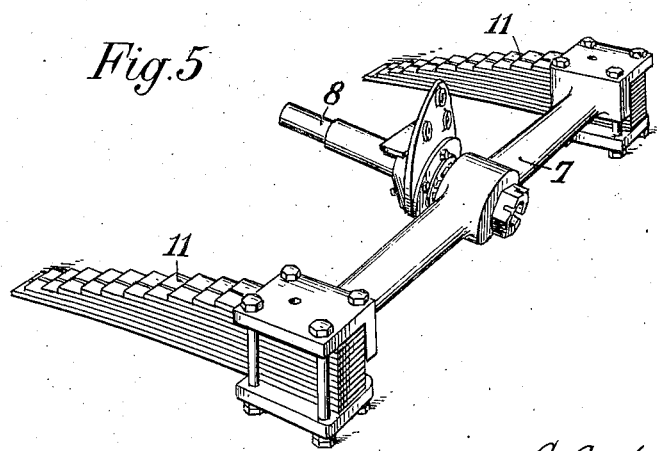
Fig. 5 is a perspective view of the beam and of the parts connected thereto.

In the example as represented, the suspension is used in connection with a frame consisting in two longitudinal frame members or bearers 1, a cross member or bearer 2, a middle longitudinal bearer or beam 3, lowered about as far as the level of the axle of the wheels 4 and connected with the longitudinal frame members by means of a low stay transom or bearer 5; to the said frame are articulated at 0 the half-axles 6 of the driving wheels. The latter are put in motion through articulated transmissions of a known system, which have not been represented.

The beam 7, disposed transversely across the frame, has in its middle a pivot bolt 8 mounted in a ball bearing 9, connected to the cross member or bearer 2 and the end of which rests on a smooth bearing 10 upon which or into which it can move, the smooth bearing being fastened to the middle longitudinal frame member or bearer 3. A safety holding device may be provided at the end of the pivot bolt or pin 8, so as to firmly maintain the same even in the case where the normal securing members should break. The resilient members are constituted by half-leaf springs 11, the swan necks of which are secured through the usual means to the two ends of the transverse beam 7 and the main leaves of which rest upon bearings 12, provided on the ends of the half-axles 6, close to the wheels.

It will be observed that the frame properly called 1, 2, 3 substantially lays upon the rear wheels but at a single point, constituted by the central pivot bolt or pin 8.

When one of the said wheels passes over an important obstacle, as shown in Fig. 4, it raises, through the medium of its spring 11, the corresponding end of the transverse beam 7 which oscillates about its opposite end maintained at about the same height as before and rather tending to move down as a result of the flexure of the corresponding spring 11; the result is that the pivot bolt 8 is slightly raised and that this raising motion only is transmitted to the vehicle frame through the pivot bolt or pin 8 without exerting upon the frame any stress or torque capable of causing it to twist.

This invention of course does not limit itself to the embodiment which has just been described and, on the contrary, the shape and the arrangement of the various parts may be modified in any suitable and required manner. Also the use of this suspension device is not limited to the motor vehicles rolling on uneven roads or grounds; the same can on the contrary be usefully utilised in connection with all sorts of vehicles, either motor vehicles or not, for example in connection with the railway engines, cars, street cars and the like. Finally, the said suspension with beam may also be used in connection with full axle vehicles.

I claim:

1. In a suspension for motor vehicles and the like, the combination of a frame, a transverse beam or flier, adapted to swing around a substantially horizontal shaft or axle situated in the vertical middle plane of the vehicle frame, a longitudinal half-spring rigidly connected to each end of the said transverse beam, two cross axles articulated in the vicinity of the said middle vertical plane each of which carries a wheel at its free end, the free ends of the said half-springs being connected to the said cross axles.

2. In a suspension as claimed in claim 1, the said beam is connected at its middle with a longitudinal pivot bolt or pin extending on the same side as the springs relatively to the said beam and mounted, on the one hand, upon a ball bearing close to the said beam and, on the other hand, upon a smooth bearing, at its end opposite to the said beam.

GEORGES GUÉRARD.